Sept. 7, 1965 G. W. FYLER ETAL 3,205,401

TRANSISTORIZED HORIZONTAL SWEEP CIRCUIT AND ASSOCIATED TRANSFORMER

Filed May 1, 1961 3 Sheets-Sheet 1

INVENTORS
George W. Fyler
Richard L. Sager

BY James E. Tracy

ATTORNEY

INVENTORS
George W. Fyler
Richard L. Sager

BY James E. Tracy
ATTORNEY

Sept. 7, 1965 G. W. FYLER ETAL 3,205,401

TRANSISTORIZED HORIZONTAL SWEEP CIRCUIT AND ASSOCIATED TRANSFORMER

Filed May 1, 1961 3 Sheets-Sheet 3

United States Patent Office 3,205,401

Patented Sept. 7, 1965

3,205,401

TRANSISTORIZED HORIZONTAL SWEEP CIRCUIT AND ASSOCIATED TRANSFORMER

George W. Fyler, Lombard, and Richard L. Sager, Roselle, Ill., assignors to Zenith Radio Corporation, a corporation of Delaware Filed May 1, 1961, Ser. No. 106,859
17 Claims. (Cl. 315—27)

This invention pertains in general to a new and improved scanning system for developing a sawtooth current waveform in the magnetic deflection yoke normally employed for the picture tube in a conventional television receiver. More specifically, the invention relates to a transistorized horizontal sweep and high voltage generating system for a television receiver.

There has been a trend in the television receiver field toward the production of larger and brighter pictures, employing shorter picture tubes. This requires higher picture tube anode voltages and increasing deflection power for wider angle scanning or sweeping. Considerable development work has taken place regarding the transistorizing of each of the various sections of a television receiver, including the scanning or sweep systems. To employ a transistor scanning system to sweep the present-day wide angle, flat faced picture tubes, especially when it is desired to operate the system and in fact the entire television receiver from a battery voltage supply, such as is the case with completely portable television sets, presents a substantial problem due to the power requirements and also due to the linearity requirements of the sweep signals. As is well recognized, the horizontal sweep system ordinarily accounts for a major portion of the total power consumed in a television receiver. The present invention solves this problem and provides a scanning system requiring relatively little power considering the results achieved.

Accordingly, it is an object of the present invention to provide a new and improved transistor scanning system particularly applicable to a television receiver.

It is another object to provide a transistor horizontal scanning generator for producing a sawtooth current waveform in a magnetic deflection yoke suitable for sweeping contemporary wide angle, flat faced picture tubes.

The invention, in accordance with one of its many aspects, provides a scanning generator for developing in a substantially inductive magnetic yoke a periodically recurring sawtooth current waveform having during each cycle a relatively long trace interval and a relatively short retrace interval. There is an oscillator including a first transistor, a load which is at least partially inductive, and means for alternately rendering the first transistor conductive during the trace intervals and nonconductive during the intervening retrace intervals. The load builds up and stores energy during each of the trace intervals. An output stage is provided which includes a second transistor having input and output electrodes, the latter electrodes being coupled to the magnetic deflection yoke. Finally, there are means coupled to the inductive load for supplying a drive signal to the input electrodes of the second transistor to render the second transistor conductive during each of the trace intervals thereby to establish an output current in the yoke of sawtooth waveshape, the drive signal containing a component during each of the retrace intervals, resulting from the stored energy, of an amplitude and polarity to render the second transistor non-conductive.

The features of this invention which are believed to be new are set forth with particularity in the appended claims. The invention, together with further objects and advantages thereof, may best be understood, however, by reference to the following description in conjunction with the accompanying drawings in which:

Figure 1:
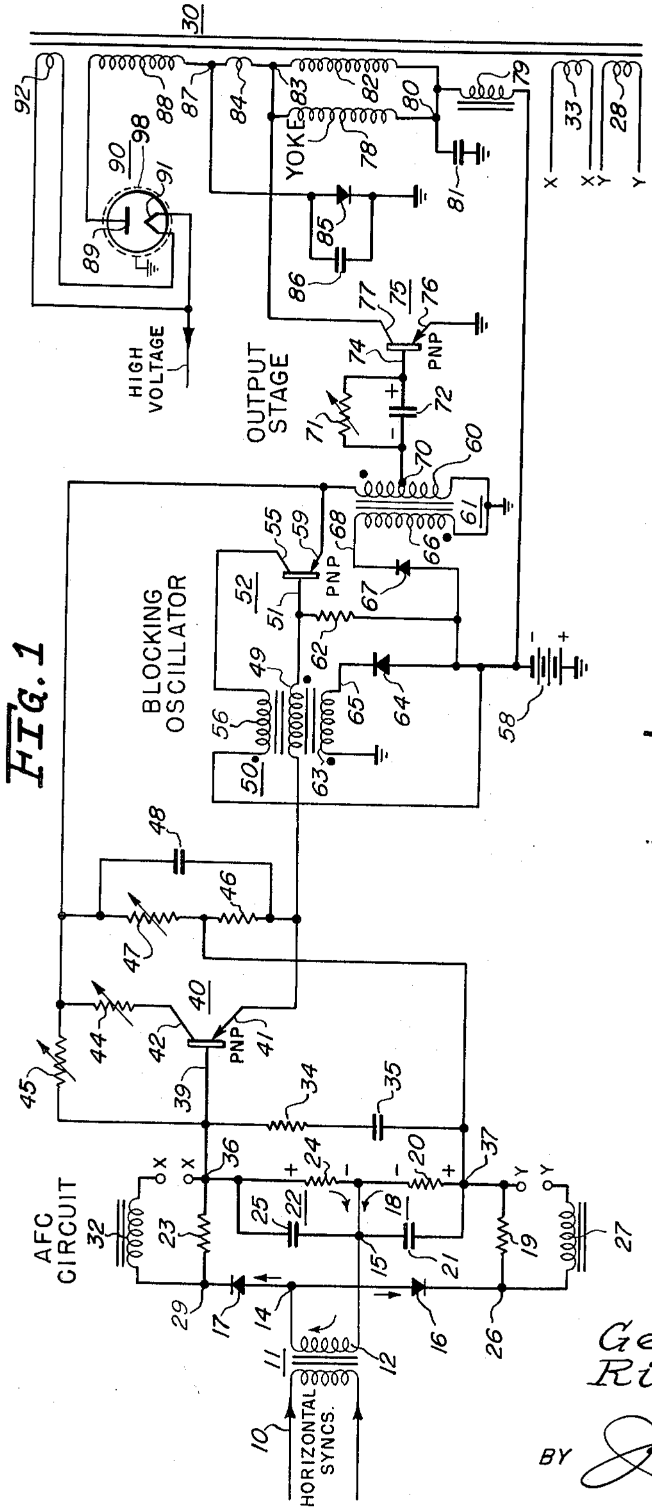
FIGURE 1 is a schematic diagram of a transistorized horizontal sweep system for a television receiver constructed in accordance with the invention.

Turning now to a structural description of the scanning system of FIGURE 1, the primary winding 10 of a transformer 11 is coupled to a source of horizontal or line synchronizing pulses. One side of secondary winding 12 of transformer 11 is coupled to a circuit junction or terminal 14 and the other side of winding 12 is connected to a circuit junction 15. Junction or terminal 14 is connected to the plate or anode of a unidirectional device or diode 16 and also to the plate or anode of another unidirectional device or diode 17, the cathode of diode 16 being connected through a resistor 19 and the parallel combination 18 of a resistor 20 and a condenser 21 to circuit junction or terminal 15. The cathode terminal of diode 17 is similarly coupled through a resistor 23 and a resistor 24, shunted by a capacitor 25, to circuit junction 15. For convenience, the parallel combination of resistor 24 and condenser 25 is designated network 22.

Connected in parallel with resistor 19 is the series combination of an inductance coil 27 and a secondary winding 28 of a horizontal output transformer 30. In the interest of simplifying the drawing, terminals Y—Y of resistor 19 and coil 27 have been shown to indicate a connection with corresponding terminals Y—Y of winding 28. Likewise, resistor 23 is shunted by the series combination of an inductance coil 32 and a secondary winding 33 of horizontal output transformer 30, winding 33 being interconnected with resistor 23 and coil 32 by means of terminals X—X. For convenience, the junction of resistor 19, coil 27, and the cathode of diode 16 is designated by the numeral 26. Likewise, the junction or terminal of resistor 23, coil 32, and the cathode of diode 17 is labeled 29.

The series combination of a resistor 34 and a capacitor 35 is coupled between the junction 36 of resistor 23 and network 22 and the junction 37 of resistor 19 and network 18.

All of the circuitry in the drawing discussed thus far collectively constitute an automatic frequency control (AFC) circuit of the balanced phase detector type for providing a control signal between terminals 36 and 37 (and thus across networks 18 and 22 which together constitute a two-section load circuit) varying in accordance with changes in the relative phase of the horizontal synchronizing pulses applied to primary winding 10 and the scanning signals developed in horizontal output transformer 30. Condensers 21 and 25 filter out the horizontal frequency components.

Circuit junction 36 is also connected to the base electrode 39 of a PNP type transistor 40. Collector 42 of PNP transistor 40 is connected through a pair of adjustable resistors 44 and 45 to base 39, the junction of resistors 44 and 45 being coupled through an adjustable resistor 47 and a fixed resistor 46 to emitter 41. Resistors 46 and 47 are shunted by a condenser 48, and the junction of those resistors is connected to junction or terminal 37. Transistor 40 presents a resistance between emitter 41 and collector 42, the value of which is determined by the instantaneous amplitude of the control signal developed across two-section load circuit 18, 22.

Emitter 41 is connected through a secondary winding 49 of a transformer 50 to the base electrode 51 of another PNP type transistor 52. Collector electrode 55 of transistor 52 is connected through the primary winding 56 of transformer 50 to the negative terminal of a source of unidirectional operating potential, shown as a battery 58, the positive terminal of which is connected to ground. Emitter 59 of transistor 52 is connected to the junction of resistors 44, 45 and 47 and also through a load, in the form of an inductance coil 60, to ground. More specifically, inductance coil 60 constitutes the primary winding of a transformer 61. Since the operation of inductance coil 60 is affected by the circuitry coupled thereto, the term "inductive load 60" actually refers to coil 60 plus the resistive circuitry coupled thereto. Load 60 comprises the load on transistor 52. Base 51 is connected to the negative terminal of potential source 58 via a resistor 62. Transformer 50 has another secondary winding 63, one terminal of which is connected to ground and the other (designated 65) of which is connected to the cathode terminal of a unidirectional device or diode 64, the anode terminal of diode 64 being connected to the negative terminal of potential source 58. Inductively coupled to inductance coil 60 is a coil 66, one side of which is connected to ground and the other (designated 68) to the cathode terminal of a unidirectional device or diode 67, the anode or plate terminal of the diode being connected to the negative terminal of source 58.

The circuit elements associated with transistor 52 collectively function as a blocking oscillator, the free running operating frequency of which is determined in part by the instantaneous resistance presented between emitter 41 and collector 42 of transistor 40. As will be described in detail later, transistor 52 conducts during each trace interval and is turned off during each retrace interval.

A tap 70 of inductive load or primary winding 60 is connected through an adjustable resistor 71, shunted by a capacitor 72, to the base electrode 74 of another PNP type transistor 75. Emitter electrode 76 of transistor 75 is grounded, while collector 77 of the transistor is coupled to the negative terminal of potential source 58 by way of a horizontal magnetic deflection yoke 78 and an inductance coil 79 connected in series. Although deflection yoke 78 may have some resistance, with respect to the horizontal scanning frequency it acts substantially as an inductive reactance. The junction 80 of yoke 78 and inductance coil 79 is by-passed to ground via a condenser 81. The primary winding 82 of horizontal output transformer 30 is connected in shunt with yoke 78. An additional winding 84, preferably constituting only a single winding turn, of transformer 30 is connected in series-aiding relationship with primary winding 82, one terminal of additional winding 84 consequently being connected to high potential terminal 83 of winding 82, while the other terminal 87 is connected to the plate or anode terminal of a unidirectional device or damper diode 85, the cathode terminal of which is connected to ground. A condenser 86 shunts damper 85.

Transistor 75 and the circuitry associated therewith collectively constitute an output stage which, in response to an input drive signal from the blocking oscillator, effects the translation of a periodically recurring sawtooth waveform in magnetic deflection yoke 78. As will be discussed at length subsequently, transistor 75 is switched or turned on during each trace interval and is cut off during retrace.

Also connected to primary winding 82 and additional winding 84 is secondary winding 88, one terminal of which is consequently connected to high potential terminal 87 of additional winding 84 and the other terminal of which is connected to the plate or anode 89 of a high voltage rectifier tube 90. The cathode filament 91 of rectifier 90 is connected to another winding 92 of horizontal output transformer 30 in order to receive heater power. An output connection is provided on one side of filament-cathode 91 to provide high voltage for the second anode of a conventional picture tube. It, of course, will be noted that with respect to windings 82, 84 and 88 output transformer 30 functions as an auto-transformer.

Figure 2:
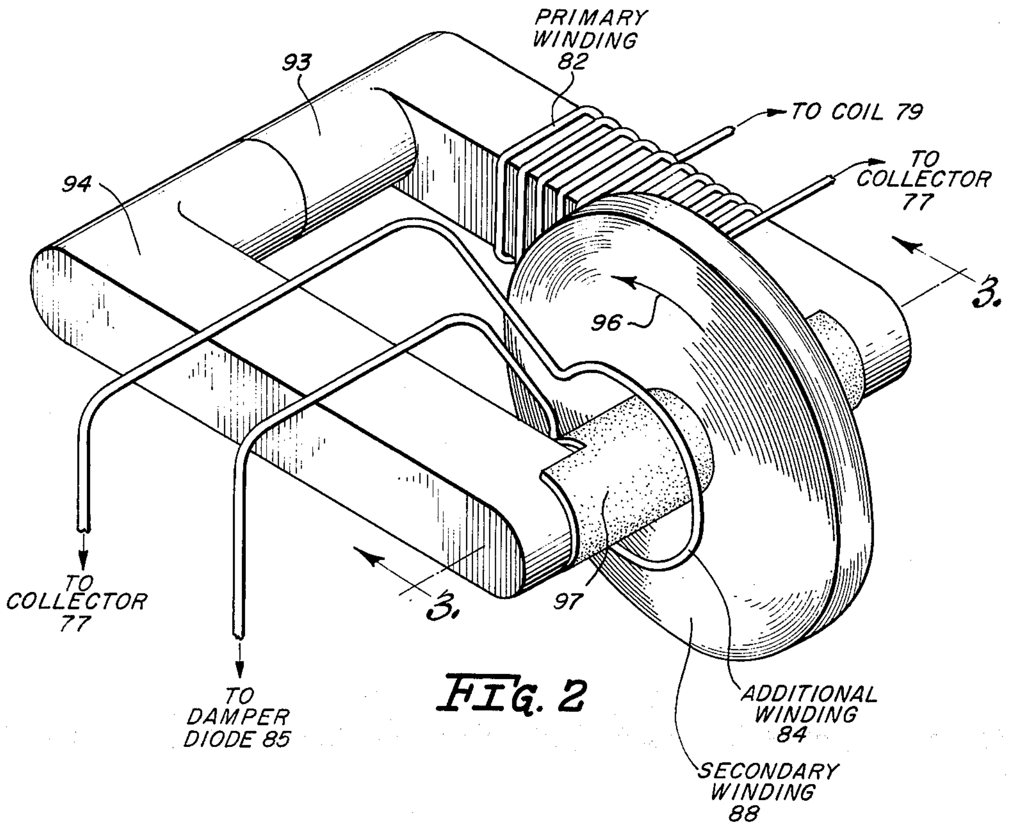
FIGURE 2 illustrates the detailed construction of one of the elements of the system of FIGURE 1.
Figure 3:
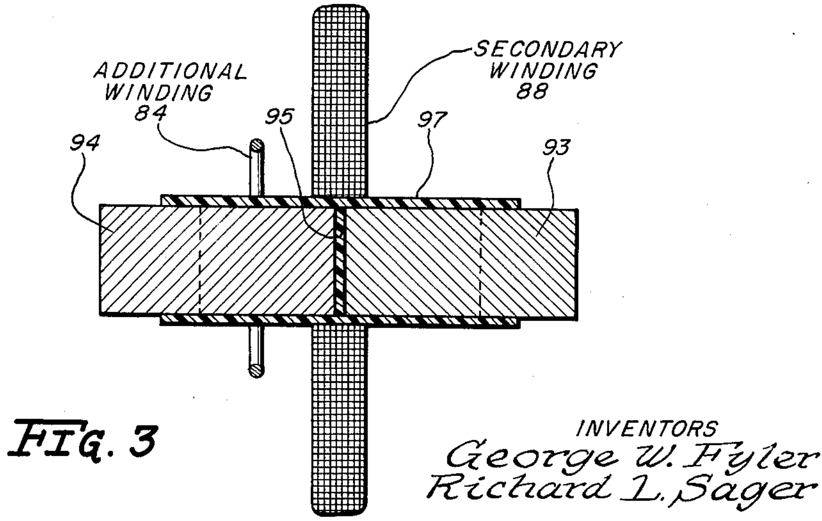
FIGURE 3 is a cross-sectional view of the apparatus of FIGURE 2 taken along the line 3—3; and, FIGURES 4 and 5 comprise signal waveforms helpful in explaining the operation of the sweep system of FIGURE 1.

A portion of the physical construction of horizontal output transformer 30 is shown in detail in FIGURES 2 and 3. The transformer contains a pair of matching U-shaped iron or ferrite cores 93, 94 mounted together to form a four-legged core structure. Cores 93 and 94 may be held together by means of clamping devices or the like (not shown). The cores are in physical contact where they meet on the left of FIGURE 2, whereas their joining on the right is separated by an insulating disc or element 95, as clearly shown in the cross-sectional view of FIGURE 3. Primary winding 82 is relatively tightly wound on one leg of the complete core structure, specifically on the leg provided by core member 93. For reasons which will become apparent hereinafter, primary winding 82 is slidable along core 93. Secondary winding 88 which, of course, includes a relatively large number of winding turns compared to the number of winding turns of primary 82, is wound around the leg of the core structure provided by a portion of core member 93 and a portion of core 94. Specifically, secondary winding 88 is centered over the air gap provided by insulator 95, as shown in FIGURE 3. The direction in which the winding 88 is wound is shown by arrow 96. Secondary winding 88 is separated from the core structure by means of insulating sleeve 97. Additional winding 84 in the preferred embodiment constitutes merely a single winding turn which is relatively loosely wound around core member 94. It is adjacent secondary winding 88 on the side opposite to that which is closest to primary winding 82. Any suitable means may be employed to space winding 84 away from core 93. For example, wax may be placed over sleeve 97 and winding 84 may be supported by the wax.

Figure 4:
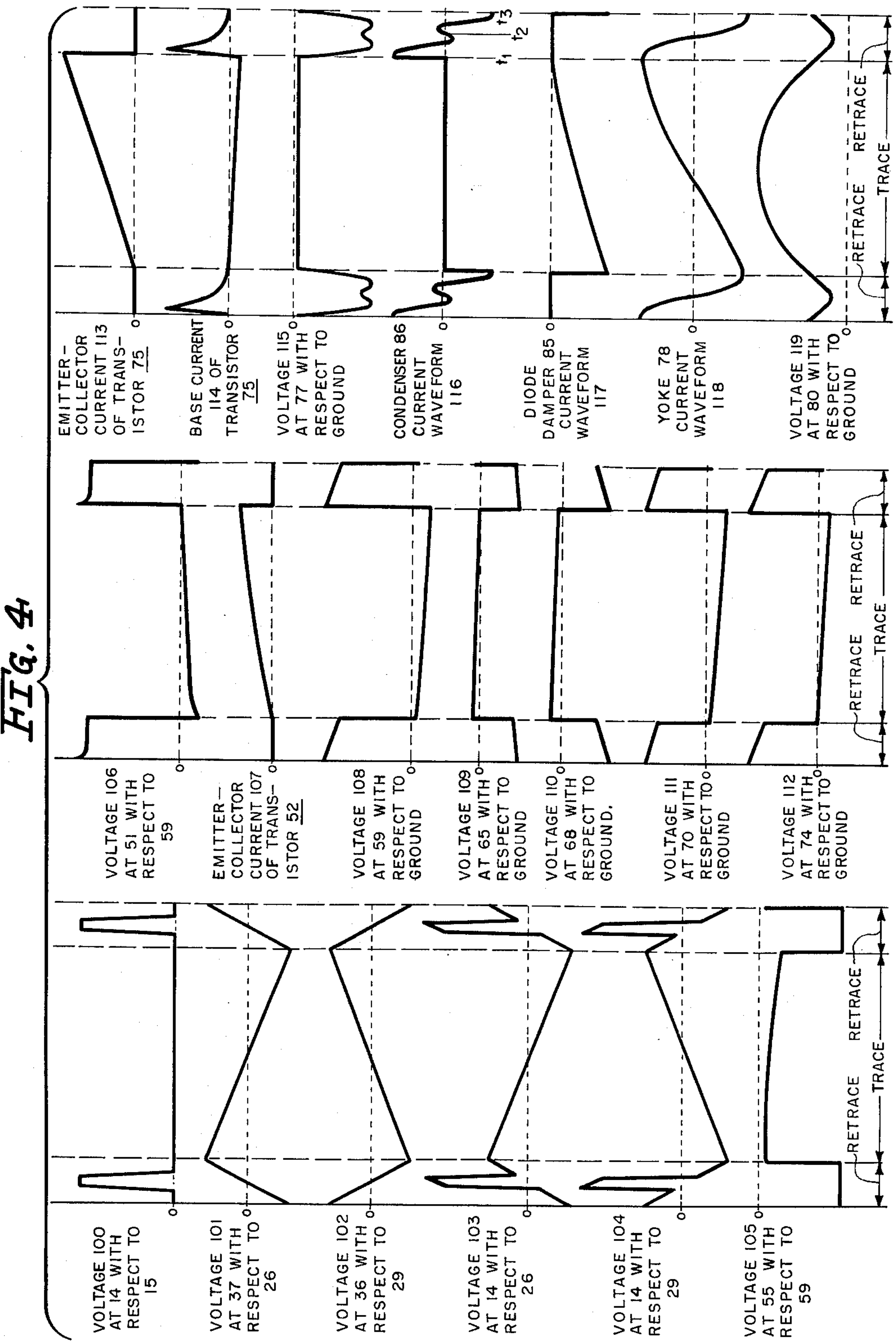

In describing the operation of the invention, attention is also directed to the signal wave forms of FIGURE 4 which appear between various points or terminals in the circuit diagram of FIGURE 1. Conventional horizontal- or line-synchronizing pulses periodically recurring at the horizontal- or line-scanning frequency are derived from the customary synchronizing signal separator (not shown) and are applied to primary winding 10 of transformer 11. They appear as positive polarity pulses at terminal 14 with respect to terminal 15 as shown by voltage wave form 100 in FIGURE 4. Of course, each pulse of wave form 100 occurs during a retrace interval. Meanwhile, flyback pulses, each of which also occurs during a retrace interval of a line-scanning cycle, are developed in windings 28 and 33 of horizontal output transformer 30 and are fed back to the automatic frequency control circuit. Resistor 19 and inductance coil 27 constitute an integrating circuit with respect to the flyback pulses developed across winding 28, and likewise resistor 23 and inductance coil 32 constitute an integrating circuit for the flyback pulses developed in winding 33. As a consequence, sawtooth shaped voltage waveforms 101 and 102 are developed across resistor 19 and resistor 23, respectively. Waveform 101 is found at terminal 37 relative to terminal 26, and waveform 102 appears at terminal 36 with respect to terminal 29. The phase relationship between these sawtooth voltages is, of course, opposite and constant. Sawtooth shaped signals 101 and 102, which have amplitudes less than that of the sync pulses across secondary 12, indicate the instantaneous operating frequency of the scanning generator, namely the combination of the blocking oscillator and output stage of FIGURE 1.

It will be noted that the balanced phase detector includes two separate series circuits, one of which includes, in the order named, the synchronizing pulse signal source, namely secondary winding 12, diode 16, the integrating circuit of resistor 19 and coil 27 which constitute a source of sawtooth shaped signal 101, and section 18 of two-section load circuit 18, 22. The other series circuit includes, in the order named, pulse signal source 12, diode 17, the integrating circuit including resistor 23 and coil 32 which is a source of a sawtooth shaped signal 102, and a section 22 of two-section load circuit 18, 22. Diodes 16 and 17 are thus connected in series opposition across the two-section load circuit whereas they are connected in parallel across source 12. Consequently the synchronizing pulses render diodes 16 and 17 conductive at the same time and effect equal current flow (ignoring the sawtooth voltage of waveforms 101 and 102) through loads 18 and 22 in the direction of the arrows. As a result, the sync pulses produce average voltages across resistors 20 and 24 with the polarity shown by the + and − signs, which voltages tend to cancel out across two-section load circuit 18, 22, namely between circuit junctions or terminals 36 and 37. Likewise, sawtooth signals 101 and 102 (ignoring the sync components) also tend to produce average current flows through loads 18 and 22 which cancel out across the two-section load circuit, diode 16 conducting to effect current flow through load 18 in the direction shown by the adjacent arrow during the positive portions of voltage waveform 101 and diode 17 conducting to cause current flow through load 22 in the direction shown by the adjacent arrow during the positive portions of voltage waveform 102. Assuming that the sawtooth voltages are of the same amplitude, average voltages are developed across resistors 20 and 24 with the polarity shown and cancel out to zero across the entire two-section load section 18, 22.

Considering now the effect of the synchronizing pulses of voltage waveform 100 on the operation of the balanced phase detector and assuming that the operating frequency of the blocking oscillator and the output stage is precisely in synchronism with the frequency of the horizontal synchronizing pulses, voltage waveform 103 appears between terminal 14 and the cathode of diode 16 (junction 26), and voltage waveform 104 appears between circuit junction 14 and the cathode of diode 17 (junction 29). It will be noted that the synchronizing components of waveforms 103 and 104 appear substantially at the midpoint of the retrace intervals. Under such circumstances, the average amplitudes of the voltages developed across load circuits 18 and 22 are equal and thus both the sawtooth shaped signals and the synchronizing pulse signals are effectively cancelled out between terminals 36 and 37. As a result, there will be a zero voltage difference between terminals 36 and 37 which is indicative of operation of the scanning generator precisely at the line-scanning frequency. Transistor 40 is normally operated in the middle of its conduction range (namely, Class A), resistor 45 providing a forward bias. Base 39 is consequently normally slightly negative relative to emitter 41. Resistors 47 and 46 are selected such that their junction is at the same negative potential as base 39. With this arrangement, when there is a zero voltage difference across terminals 36 and 37, transistor 40 still operates causing an emitter-collector current flow of a magnitude representing operation of the line-scanning generator exactly at the horizontal sync frequency.

If the phase relationship which exists between the sawtooth shaped signals 101 and 102 tends to deviate from the frequency of the line-synchronizing components, the phase relationship between the sync pulses and the sawtooth shaped signals will vary. Assuming, for example, that the scanning generator tends to operate at a faster or higher frequency than the frequency of the horizontal syncs, the phase relationship between the sync pulses and the sawtooth component of waveform 103 will vary, the sync pulses occurring some time during the second half of each of the retrace intervals. As a consequence, the peak voltage of waveform 103 increases while the peak voltage of waveform 104 decreases, causing an unbalance of the voltages developed across two-section load circuit 18, 22. Specifically, the average voltage developed across section 18 will be greater than that developed across 22, which has a net effect of increasing the voltage difference between emitter 41 and base 39, the base going negative with respect to the emitter. This increases the emitter-collector current of transistor 40, causing a decrease in the frequency of the blocking oscillator.

The automatic frequency control circuit of FIGURE 1, which is described and claimed in copending divisional application Serial No. 242,497, filed December 5, 1962, is thus accurately balanced and achieves improved immunization against noise disturbances.

The frequency of operation of the blocking oscillator, and consequentially the frequency of operation of the scanning generator, is determined in part by the AFC control signal developed across two-section load circuit 18, 22. Resistors 44, 45, 46 and 47 also affect the blocking oscillator frequency. Adjusting resistor 45 varies the operating point of transistor 40, resistor 44 determines the range of operation, and the adjustment of resistor 47 varies the frequency of the blocking oscillator. Since the emitter-collector path of transistor 40 is in series with the base-emitter circuit of blocking oscillator transistor 52, the amplitude and polarity of the AFC control voltage applied to the base-emitter junction of transistor 40 will determine, in part, the magnitude of the base input drive current for transistor 52. This follows because the resistance between emitter 41 and collector 42 varies with variations in the AFC control voltage.

Transistor 52 is normally forward biased by virtue of the connection of base 51 to the negative terminal of operating potential source 58 via resistor 62, emitter 59 being at ground potential. When the system is initially placed into operation, transistor 52 is turned on, like a switch, as a result of the forward bias provided by potential source or battery 58 and a trace interval is started. At that time, the amount of base drive current flowing through the base-emitter path of transistor 52 is more than enough to maintain the transistor in a saturated condition. This effects current translation through the series circuit including inductive load or primary winding 60, the emitter-collector path of transistor 52 and primary winding 56 of transistor 50 to the negative terminal of potential source 58.

However, due to the fact that the collector load, including primary 56 and primary 60, is largely inductive, the emitter-collector current of transistor 52 is not permitted to increase instantaneously but instead increases in sawtooth fashion. The increasing current in primary winding 56 induces a voltage in secondary winding 49, the negative polarity terminal of which is that connected to base 51 in order to maintain transistor 52 conductive.

Inasmuch as inductive load 60, which as mentioned before actually includes the circuitry coupled thereto, has a resistive component, the emitter-collector current of transistor 52 does not increase completely linearly. The time rate of change of current through primary winding 56 therefore decreases while the emitter-collector current is increasing. Consequently, the voltage induced in winding 49 decreases with a resultant decreasing base drive current. The emitter-collector current increases until the decreasing base drive current reaches the point at which transistor 52 no longer is saturated. At that instant, the rise in collector current ceases and the magnetic field of primary 56 collapses to induce a voltage in secondary winding 49 of a positive polarity at the terminal adjacent base 51 to reverse bias the base-emitter junction of transistor 52, cutting it off rapidly. The cutting off process is aided by the customary regenerative action typical in blocking oscillators.

Transistor 52 is maintained in its off condition during an interval, which of course is the retrace time, determined primarily by the construction of transformer 50. The positive voltage across winding 49 must terminate before transistor 52 becomes forward biased again to initiate another cycle of operation in the same manner as described.

As is well known, changing the base drive current, which occurs by varying the resistance between emitter 41 and collector 42 of transistor 40, changes the saturation point of transistor 52 and thus changes the frequency of operation of the blocking oscillator. For example, decreasing the base drive current lowers the saturation point and thus decreases the trace time.

Voltage waveform 105 of FIGURE 4 appears between collector 55 and emitter 59. The voltage drop across the emitter-collector path increases in a negative sense during each trace interval because the increasing collector current during each trace interval effects an increasing voltage drop from emitter to collector. Voltage waveform 105 goes substantially negative during each retrace interval due to the voltage developed across primary winding 56 as a result of the magnetic energy built up and stored during each trace interval. In a manner to be discussed later, it will be shown that the amplitude of the negative pulses of waveform 105 occurring during retrace is limited by means of an energy conservation circuit in order to restrict the magnitude of the inverse voltage developed between collector 55 and base 51.

Voltage waveform 106 appears between base 51 and emitter 59. Base 51 goes negative with respect to emitter 59 at the start of each trace interval as a result of the voltage induced in secondary winding 49 from the increasing collector current flowing through primary winding 56. However, as mentioned before, the voltage across secondary winding 49 decreases as each trace interval progresses resulting in the positive going voltage of waveform 106. The relatively high amplitude pulses occurring during retrace result from the stored magnetic energy of primary winding 56 which causes extremely rapid cutoff of transistor 52. As in the case of waveform 105, the amplitude of the pulses of waveform 106 occurring during retrace is limited by means of an energy conservation circuit to be described.

Current waveform 107 shows the shape of the current signal flowing through the emitter-collector conduction path of transistor 52. As previously described, the resistance in the output load of the transistor results in the slight deviation from a perfect sawtooth waveform.

Voltage waveform 108 appears at emitter 59 with respect to ground. The voltage increases negatively during each trace interval because of the increasing emitter-collector current of transistor 52. The voltage across inductive load 60 is substantially proportional to the increasing collector current multiplied by the reflected or transferred load resistance of the base-emitted circuit of transistor 75. During each trace interval, inductive energy is stored in the magnetic field of inductive load 60. The relatively high amplitude positive going pulses of waveform 108 occurring during retrace result from the energy built up and stored in inductive load 60 during each trace interval. The development of these high amplitude positive pulses and their function constitute one of the salient features of the invention, as will be seen. The reason that such pulses decrease in amplitude during each retrace interval will be discussed subsequently.

As in the case of voltage waveforms 105 and 106, the amplitude of the positive pulses of voltage waveform 108 are limited by means of an energy conservation circuit to restrict the magnitude of the inverse voltage developed between collector 55 and emitter 59 as a result of such retrace pulses.

In order to conserve energy and also to limit the inverse voltage developed between base 51 and collector 55 during each retrace interval, a voltage is induced in secondary winding 63 of such a polarity, at the terminal connected to diode 64, to turn diode 64 on and effect the flow of current to potential source 58. As shown by voltage waveform 109 which appears at the junction 65 of winding 63 and diode 64 relative to ground, negative going pulses are developed during retrace in order to render diode 64 conductive to provide a path for the energy represented by such negative pulses. Battery 58 is thus actually charged up during retrace by the negative pulses of waveform 109. In this way, the amplitude of the negative pulses of voltage waveform 105 and the positive retrace pulses of waveform 106 are limited considerably, while at the same time current is caused to flow back into battery 58.

By the same token, some of the energy built up and stored in inductive load 60 during each trace interval, and dissipated during each retrace interval, is utilized to induce a voltage across secondary winding 66 of such an amplitude and polarity that diode 67 is turned on and current flows back into and charges battery 58. As shown by voltage waveform 110 which appears between the cathode of diode 67 (junction 68) and ground, the energy conservation circuit develops negative going pulses during each retrace interval to render diode 67 conductive and provide a path for the energy represented by such negative pulses back to potential source 58. By employing the energy conservation circuit including winding 66 and diode 67, the amplitude of the positive going pulses of voltage waveform 108 occurring during retrace is limited to limit the inverse voltage developed between emitter 59 and collector 55.

It will be noted that the retrace pulses of voltage waveforms 109 and 110 decrease in amplitude as each retrace interval progresses, the waveforms becoming less negative during each retrace interval. The reason for this is that the magnetic energy stored in primary winding 56 and inductive load 60, and not required to turn transistors 52 and 75 off, dissipates at a more rapid rate at the very beginning of retrace with respect to the rate of dissipation at the end. Accordingly, the magnetic fields of windings 56 and 60 collapse more rapidly at the start of each retrace interval, causing the current flow through each of diodes 64 and 67 to decrease during retrace. This results in a decreasing potential across diodes 64 and 67 during retrace.

Output transistor 75 in a sense is operated in a similar fashion as transistor 52, in that it basically serves as a switch, being turned on or rendered conductive during each trace interval, and is turned off or rendered nonconductive during each retrace interval.

Due to the fact that only a portion of load 60 is coupled across the base-emitter junction of transistor 75, the voltage of waveform 111, which is identical to that of waveform 108 with the exception that the amplitude is reduced, is developed at tap 70 of inductive load 60 for application through the combination of resistor 71 and condenser 72 to base 74 of transistor 75. Since emitter 76 is grounded and voltage waveform 111 is negative throughout each trace interval, PNP transistor 75 is rendered conductive during each trace interval. For reasons which will become apparent, condenser 72 is provided, along with resistor 71, to assume a charge condition in response to the base input drive current of transistor 75 sufficient to provide a bias voltage across condenser 72 of the polarity indicated in the drawing which tends to reverse bias the emitter-base junction of transistor 75. Due to the presence of units 71 and 72, the voltage of waveform 111 appears as shown by waveform 112 at base 74 relative to ground.

Condenser 81, being in shunt with battery 58 by way of coil 79, provides a voltage source. Thus, when transistor 75 is turned on during each trace interval the voltage appearing across condenser 81 is effectively applied to the parallel arrangement of yoke 78 and primary winding 82. Unlike the load on transistor 52, which has a resistive component, yoke 78 and primary 82 present a substantially inductive load. The current flowing through the emitter-collector path of transistor 75 is therefore of substantially sawtooth shape as shown by current wave form 113.

To achieve the ultimate in power savings, it is imperative that transistor 75 be turned or cut off instantaneously at the beginning of retrace. An important aspect of the present invention resides in utilizing the energy stored in inductive load 60, which gives rise to the positive retrace pulses of curve 112, to obtain rapid cut-off of transistor 75. At the beginning of retrace when transistor 52 is turned off, the current in load 60, of course, no longer can flow through transistor 52. Because of the turns ratio between the entire coil 60 compared to that portion tapped off (namely, between tap 70 and ground) and coupled to base 74 of transistor 75, the current in coil 60 during retrace is stepped up by transformer action to provide a relatively high amplitude current flow through the base-emitter path of transistor 75 in a direction to render transistor 75 non-conductive. Tapping down on coil 60 thus constitutes a feature of the invention, as it effects the generation of high amplitude current pulses for cutting transistor 75 off during retrace.

Since current increases through yoke 78 during trace at a rate determined by the inductance of the yoke, as well as by the voltage across condenser 81, the input drive voltage of wave form 112 may simply constitute a negative pulse component of constant amplitude lasting the entire trace interval. However, another one of the outstanding features of the invention lies in driving the base-emitter junction of transmitter 75 with a voltage which increases substantially linearly during each trace interval, the amplitude of the input drive voltage, and consequently the base input drive current, at any given instant during each trace interval being only slightly more than adequate to effect the maximum collector current permitted by the inductance of the yoke at that time. This represents a power savings as negligible base input drive current is wasted; only that amount of base current is required which permits current build-up in the yoke at a rate dictated by the inductance of the yoke and the beta variation of transistor 75.

The base input drive current for transistor 75 is accordingly shown by means of current waveform 114. As noted above, the base current increases during each trace interval. The pulse components of current waveform 114 during retrace result from the presence of stored minority carriers in transistor 75. To explain, most transistors store minority carriers in their base-collector regions when their base-emitter junctions are forward biased and collector current flows. Transistor 75 may be of that type. At the termination of each trace interval the forward bias provided by the input drive voltage of waveform 112 is effectively removed and replaced by a relatively strong back or reverse bias (positive voltage) as a result of the dissipation of the energy stored in inductive load 60 during each trace interval. However, even in the face of such high amplitude positive pulses applied to base 74, the collector current does not cease immediately but continues for a finite time by virtue of the stored minority carriers and during the decay time. The pulses of current waveform 114 occurring during retrace intervals represent the current flow when the minority carriers are swept away. Of course, as mentioned before, it is desirable to effect rapid turn off of transitsor 75 at the start of each retrace interval to minimize the power consumption.

The reverse bias voltage developed by the combination of resistor 71 and condenser 72 serves two very important purposes. During retrace, a sufficient positive voltage between base 74 and emitter 76 is required to insure cut-off of collector current. In the absence of condenser 72 and resistor 71, the necessary positive voltage pulse would, of course, be applied back to inductance coil 60 between tap 70 and ground and stepped up by transformer action across the entire coil 60 to manifest as a considerably higher positive voltage pulse at emitter 59 of transistor 52 with respect to ground. Such an inverse voltage may be high enough to inflict serious damage on transistor 52 and thus, in the interest of limiting that inverse voltage, the combination of resistor 71 and condenser 72 develops a voltage which is effectively added to that found on base 74 during trace thereby allowing a lower step-down ratio to be used and less step-up during retrace. Furthermore, by adjustment of tap 70 and the value of resistor 71 the energy storage in coil 60 can be adjusted to insure fast cut-off of base 74. Thus, high voltage pulses are provided to obtain rapid cut off of transistor 75 during retrace but yet the cutting off process does not result in the generation of an inverse voltage on transistor 52 of an amplitude to damage that transistor.

As is conventional in most horizontal sweep systems, at the conclusion of each trace interval when the generally sawtooth shaped current ceases to flow in the yoke, the magnetic fields in the yoke and output transformer tend to collapse resulting in the development of a relatively high amplitude retrace or flyback pulse. Accordingly, the voltage at collector 77, which is connected to the high potential terminal 83 of yoke 78 and primary winding 82, appears as shown in voltage waveform 115. It will be noted that waveform 115 has a harmonic component during retrace. This is due to a particular third harmonic tuning feature of the output transformer to be discussed subsequently. In conventional manner, these flyback pulses, which of course also appear across primary winding 82, are employed to induce into secondary winding 88 higher potential pulses which are rectified by high voltage rectifier 90 to provide a high voltage for the second anode of a conventional picture tube.

At the end of each trace interval when the magnetic fields in yoke 78 and primary winding 82 tend to collapse, the energy stored therein also effects current flow into condenser 86. This is shown by current waveform 116 during the first half of each retrace interval embraced by indicia $t_1$–$t_2$. During the second half of each retrace interval, namely in the period defined by indicia $t_2$–$t_3$, current flows out of condenser 86 and into yoke 78 and primary 82. At time $t_3$, the energy stored in the yoke and primary produces current translation, enduring for at least one-half of the trace interval, out of the yoke and primary and through damper diode 85, as shown by current waveform 117. During retrace, the shape of the current flowing into and out of condenser 86 constitutes one-half of a period of a complete wave, and includes fundamental and third harmonic components. The fundamental frequency of the retrace portions of waveforms 116 and 115, for convenience, may be termed the "retrace frequency" and is approximately 2.5 times the horizontal scanning frequency. The fundamental retrace frequency is determined primarily by the shunt resonant frequency of the combination of condenser 86, yoke 78, primary 82, and the reflected or transformed secondary capacitance of transformer 30. The third harmonic retrace frequency is determined largely by the series combination of condenser 86, the transformed or reflected secondary capacitance, and the leakage inductance of the transformer.

As shown by current waveform 113 the collector current of transistor 75 tends to flow from potential source 58 and through yoke 78 and primary 82 in one direction during at least the second half of each of the trace intervals (the entire trace in the preferred embodiment), while the energy remaining, at the end of retrace, in yoke 78 and primary winding 82 tends to effect current flow through yoke 78 and primary 82 in the opposite direction during at least the first half of each of the trace intervals (the entire trace interval in the illustrated embodiment), as evidenced by current waveform 117. Of course, the yoke current during trace is actually a combination of that contributed by transistor 75 (waveform 113), and by damper 85 (waveform 117), as shown by waveform 118. The yoke current (waveform 118) during retrace is essentially sinusoidal as shown and includes the current of waveform 116 through condenser 86 plus the transformed high voltage secondary current.

Yoke 78 may contain some resistance giving rise to C-type non-linearity. Uncorrected, such non-linearity gives rise to a stretching of a reproduced picture on the left and compression on the right, as the yoke current increases at a faster rate at the begining of trace, namely the left side of the picture tube. In accordance with one of the features of the invention, such non-linearity is partially corrected by means of tapping up the connection from horizontal output transformer 30 to damper 85 in order that there is an increased voltage applied to damper 85, with a consequent decrease in current, from that conventionally obtained when the damper is effectively connected in parallel with the yoke and primary winding. Thus, additional winding 84, which represents the amount by which the damper is tapped up, contributes sufficient current through yoke 78 to reduce the C-type distortion.

When it is desired to sweep a relatively wide angle, short necked, flat faced picture tube with the horizontal scanning system of the present invention, the addition of a slight S-shaped component to the sweep signal is preferable; such a component is contained in waveform 118. This is achieved in accordance with still another feature of the invention by effectively providing a periodically varying, rather than a constant, voltage source during each trace interval in the output stage. As mentioned before, when transistor 75 is turned on during each trace interval, the voltage across condenser 81 is effectively placed across yoke 78. The substantially sawtooth shaped current of yoke 78 flows through condenser 81 during trace and produces a parabolic voltage across the condenser as shown by waveform 119. The instantaneous time rate of change of yoke current is determined, of course, by the instantaneous voltage applied thereto. Therefore, since the voltage across the condenser 81 (waveform 119) is of maximum amplitude in the middle of trace and of minimum amplitude at the beginning and end of trace, the time rate of change of yoke current is greater at the middle of trace than at the beginning or end. Hence, the S-shaped component of waveform 118 is obtained.

Preferably, the relative resistance of yoke 78 and primary winding 82 are chosen so that most of the D.C. collector current flows through primary 82 instead of yoke 78. Minimizing the D.C. yoke current produces only a relatively small amount of right centering of the picture but sometimes this is desirable for alleviating neck shadow problems.

Television horizontal sweep systems are usually plagued with the problem of undesired ringing in the horizontal output transformer during the trace intervals. As is well known, this is caused by the leakage inductance and stray secondary capacitance of the transformer which resonate at a frequency, much higher than the horizontal scanning frequency. The ringing frequency during trace is slightly less than the third harmonic of the retrace oscillations since condenser 86 is shorted by damper 85 during trace. Such ringing during trace, even though it may not be manifest in the picture itself, represents a substantial power consumption which is quite significant when the horizontal sweep system is powered by a battery voltage source, as distinguished from a 110-volt A.C. power supply. Accordingly, it is most desirable to reduce the ringing signals during trace to zero or at least to a desired minimum. To this end, the primary and secondary of transformer 30 are very carefully tuned for an exact relationship between the third harmonic and the fundamental frequency of the oscillations during retrace. The leakage inductance may be reduced by winding primary 82 on core 93 (FIG- URE 2) relatively tightly. Additionally, and in accordance with a salient feature of the invention, the leakage inductance may be widely varied in order to achieve precise third harmonic tuning by sliding or adjusting primary winding 82 along core 93 to an optimum point.

The air gap of core structure 93, 94 should be under the center of high voltage secondary winding 88, as shown in FIGURE 3, to reduce ringing. Furthermore, it has been discovered that the single winding turn, comprising additional winding 84, should be relatively loosely wound on the core structure and preferably should be located on the side of secondary winding 88 which is remotest from primary winding 82 to further reduce ringing. The diameter and spacing from high voltage secondary 88 must be critically determined for a particular transformer design in order to minimize ringing during trace. This permits simultaneous damping of both fundamental and third harmonic retrace oscillations at the end of retrace and maximum energy recovery. Of course, the length of the wire conductor or lead from transformer output 30 to damper 85 should also be kept to a minimum. It has been found also that the actual as well as apparent size or width of the picture may be adjusted adequately by varying either damper condenser 86 or the stray capacitance from plate 89 of tube 90 to ground, for instance by a slidable grounded sleeve 98 on the envelope of tube 90, and yet the condition of zero or minimum ringing during trace is not upset.

The shunt damper type of horizontal sweep circuit, as provided by the present invention, has certain advantages over the series damper circuit commonly used with vacuum tubes. As the high voltage load varies, the sweep current amplitude remains essentially constant. However, the D.C. input current to the output stage of the present invention varies with high voltage load current, partially as a result of the third harmonic tuning feature, in order to provide improved high voltage regulation and size stability. Precise third harmonic tuning, obtainable in the manner described, results in more uniform and higher voltage. This is an important advantage when D.C. restoration is employed.

Figure 5:
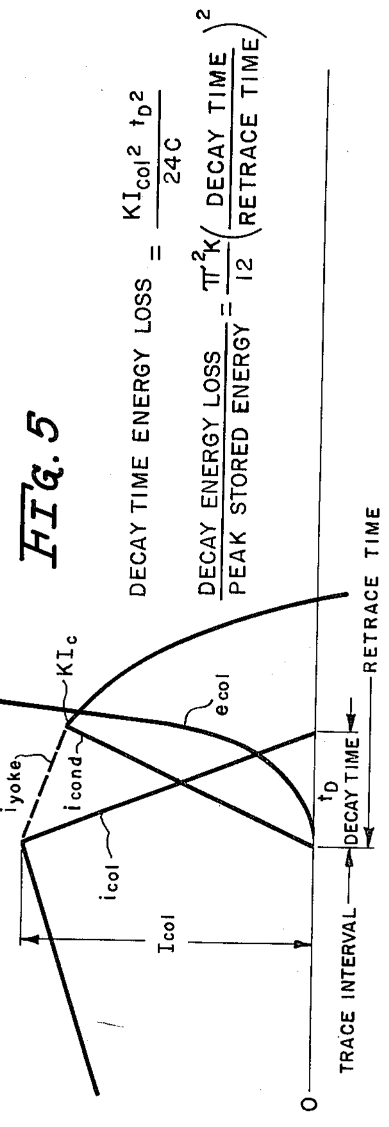

The power consumption of the horizontal scanning generator may also be minimized by slightly lengthening the retrace time. FIGURE 5 illustrates, by means of signal waveforms on a greatly expanded time scale compared to the time scale of FIGURE 4, the energy loss which occurs at the end of trace when transistor 75 is turned or switched off. In that figure, $i_{col}$ represents the instantaneous emitter-collector current of transistor 75, $I_{col}$ represents the maximum emitter-collector current, $i_{cond}$ indicates the current flowing through condenser 86, $e_{col}$ represents the instantaneous voltage between collector 77 and ground, $i_{yoke}$ indicates the current through the yoke 78, K is a constant, $KI_c$ represents the maximum current of condenser 86, and C equals the capacitance of condenser 86. During the decay time, the emitter-collector current ($i_{col}$) of transistor 75 decreases substantially linearly to zero while the collector voltage ($e_{col}$) builds up in a square law curve. The collector energy loss is therefore the integrated product of these two functions during the decay time. This loss may be reduced with faster cut-off of transistor 75 or by lengthening the retrace interval, so as to retard the rise of collector voltage $e_{col}$. The proportion of the peak stored energy loss during the decay time varies as the square of the ratio of decay time to total retrace time, as shown by the formulae immediately to the right of the waveforms of FIGURE 5. A reasonable increase in retrace time may be justified because of the non-standard aspect ratio of present-day picture tubes, and normal over scanning of the picture. However, with increased retrace time, horizontal blanking is needed to prevent picture fold, but this blanking is also desirable for eliminating both noise and sync pulse overshoot interference during horizontal retrace.

The circuit of FIGURE 1, including the following circuit parameters, has been constructed and operated very satisfactorily:

| | |
|---|---|
| Picture tube | (Not shown) 23" 110°, 23JP4. |
| Diodes 16 and 17 | GE 1N91. |
| Resistors 19 and 23 | 180 ohms. |
| Integrator choke. | |
| Coils 27 and 32 | 16 mh. each wound bifilar on one core. |
| Condensers 21 and 25 | 3 μf. |
| Resistors 20 and 24 | 1K ohm. |
| Resistor 34 | 1K ohm. |
| Condenser 35 | 5 μf. |
| Transistor 40 | 2N270. |
| Resistor 44 | 200 ohms potentiometer. |
| Resistor 45 | 10K ohms potentiometer. |
| Resistor 46 | 15 ohms. |
| Resistor 47 | 400 ohms potentiometer. |
| Condenser 48 | 7 μf. |
| Transistor 52 | 2N1147A clevite. |
| Resistor 62 | 820 ohms. |
| Diode 64 | 1N91 GE. |
| Diode 67 | 1N91 GE. |
| Inductive load 60 | 85 μhy. |
| Source 58 | 12 volts D.C., 23 watts total. |
| Condenser 72 | 500 μf. |
| Resistor 71 | 40 ohm potentiometer. |
| Transistor 75 | B1085 Bendix. |
| Yoke 78 | 30 μhy @ 1 kc. |
| Primary winding 82 | 13 turn #16 wire. |
| Additional winding 84 | 1 turn #16 wire. |
| Damper diode 85 | B203 Bendix. |
| Condenser 86 | .22 μf. |
| Condenser 81 | 20 μf. |
| Coil 79 | 700 μhy. |
| Secondary winding 88 | 2100 turns universal wound narrow 1/8" wide. |
| High voltage rectifier 90 | 1B3GT developing 18 kv. high voltage. |

Of course, while PNP type transistors have been embodied in the invention as illustrated, it is obvious that by simple modification transistors of opposite gender, namely NPN, could be utilized.

By way of summary, the invention provides, in accordance with one of its several aspects, a scanning generator for developing in a substantially inductive magentic deflection yoke 78 a periodically recurring sawtooth waveform (waveform 118) having during each cycle a relatively long trace interval and a relatively short retrace interval. An oscillator is provided, specifically a blocking oscillator, which includes transistor 52 having input electrodes 51, 59 and output electrodes 55, 59. Means are provided for alternately rendering transistor 52 conductive during each trace interval and non-conductive during intervening retrace intervals. Inductive load 60 builds up and stores energy during at least a portion of each of the trace intervals.

There is an output stage including a transistor 75 having input electrodes 74, 76 coupled to inductive load 60 and output electrodes 76, 77 coupled to deflection yoke 78. Inductive load 60 develops a drive signal (voltage waveform 111) having a component during each of the trace intervals for rendering transistor 75 conductive or turned on, thereby to establish an output current in yoke 78 of sawtooth waveform. The drive signal of waveform 111 also has another component during each of the retrace intervals, resulting from the stored energy in load 60, of an amplitude and polarity to render transistor 75 non-conductive.

According to another feature of the invention, a scanning generator is provided having a transistor 75 of the type which stores minority carriers in the base-collector region when the base-emitter junction is forward biased and collector current flows. Battery 58 constitutes a source of unidirectional operating potential coupled to transistor 75. Yoke 78 is coupled to emitter 76 and collector 77 of transistor 75. Inductive load 60, which stores energy during trace, and the associated blocking oscillator constitute means for applying an input drive voltage to the base-emitter junction of transistor 75 having a component during each of the trace intervals which forward biases the junction to supply input drive current to the base, thereby to effect current translation through the emitter-collector path and yoke 78. The collector current, however, continues for a finite time immediately subsequent to each trace interval, even in the absence of the input drive voltage, as a result of the stored minority carriers. The energy stored in load 60 produces relatively high current flow through the base-emitter junction during retrace in a direction to facilitate a relatively rapid sweeping away of the minority carriers in order to minimize the finite time interval.

While a particular embodiment of the invention has been shown and described, modifications may be made, and it is intended in the appended claims to cover all such modifications as may fall within the true spirit and scope of the invention.

We claim:

1. A scanning generator for developing in a substantially inductive magnetic deflection yoke a periodically recurring sawtooth current waveform having during each cycle a relatively long trace interval and a relatively short retrace interval, comprising: an oscillator including a first transistor, a load which is at least partially inductive, and means for alternately rendering said first transistor conductive during said trace intervals and non-conductive during said intervening retrace intervals, said inductive load thereby building up and storing energy during at least a portion of each of said trace intervals; an output stage including a second transistor having input and output electrodes, the latter electrodes being coupled to said deflection yoke; means coupled to said inductive load for supplying a drive signal to the input electrodes of said second transistor to render said second transistor conductive during each of said trace intervals thereby to establish an output current in said deflection yoke of sawtooth waveshape, said drive signal containing a component during each of said retrace intervals, resulting from said stored energy, of an amplitude and polarity to render said second transistor nonconductive; and biasing means, comprising a parallel combination of a resistor and a capacitor included in said drive signal supplying means, for developing a reverse bias voltage of a polarity tending to render said second transistor non-conductive.

2. A scanning generator for developing in a substantially inductive magnetic deflection yoke a periodically recurring sawtooth current waveform having during each cycle a relatively long trace interval and a relatively short retrace interval, comprising: a blocking oscillator including a first transistor having input and output electrodes, an inductive load coupled to said output electrodes, and means for alternately rendering said first transistor conductive during said trace intervals and non-conductive during said intervening retrace intervals, said inductive load thereby building up and storing energy during each of said trace intervals; an output stage including a second transistor having input electrodes coupled to said inductive load and output electrodes coupled to said deflection yoke, said inductive load developing a drive signal having a component during each of said trace intervals for rendering said second transistor conductive thereby to establish an output current in said deflection yoke of sawtooth waveform and another component during each of said retrace intervals, resulting from said stored energy, of an amplitude and polarity to render said second transistor non-conductive; and biasing means, including a parallel combination of a resistor and a capacitor, coupled between said inductive load and the input electrodes of said second transistor for developing a reverse bias voltage of a polarity tending to render said second transistor non-conductive.

3. A scanning generator for developing in a substantially inductive magnetic deflection yoke a periodically recurring sawtooth current waveform having during each cycle a relatively long trace interval and a relatively short retrace interval, comprising: a blocking oscillator including a first transistor having a base, emitter and collector, an emitter-collector circuit including an inductive load and the primary winding of a transformer, a base circuit including a secondary winding of said transformer, and a first source of unidirectional operating potential, said first transistor conducting during each of said trace intervals and cutting off during each of said intervening retrace intervals and said inductive load thereby building up and storing energy throughout each of said trace intervals; an output stage including a second transistor having base, emitter and collector electrodes, an emitter-collector circuit including said deflection yoke, a base-emitter circuit coupled to said inductive load, and a second source of unidirectional operating potential, said inductive load developing a drive signal having a component during each of said trace intervals for rendering said second transistor conductive thereby to establish an output current in said deflection yoke of sawtooth waveform and another component during each of said retrace intervals, resulting from said stored energy, of an amplitude and polarity to render said second transistor non-conductive; and a parallel combination of a resistor and a capacitor coupled in series with said inductive load and said base of said second transistor for developing a reverse bias voltage of a polarity tending to render said second transistor non-conductive.

4. A scanning generator for developing in a substantially inductive magnetic deflection yoke a periodically recurring sawtooth current waveform having during each cycle a relatively long trace interval and a relatively short retrace interval, comprising: an oscillator including a first transistor having a base, emitter and collector, an emitter-collector circuit including an inductive load, a source of unidirectional operating potential, and means for alternately rendering said first transistor conductive during said trace intervals and non-conductive during said intervening retrace intervals, said inductive load thereby building up and storing energy throughout each of said trace intervals but dissipating said stored energy during each of said retrace intervals with a consequent build up of an inverse voltage between said collector and emitter; an energy conservation circuit coupled to said inductive load for returning, during each of said retrace intervals, some of said stored energy back to said potential source while at the same time limiting the magnitude of said inverse voltage developed between said collector and emitter; an output stage including a second transistor having input and output electrodes, the latter electrodes being coupled to said deflection yoke; and means for supplying a drive signal from said inductive load to the input electrodes of said second transistor to render said second transistor conductive during each of said trace intervals, thereby to establish an output current in said yoke of sawtooth waveshape, said drive signal containing a component during each of said retrace intervals, resulting from said stored energy, of an amplitude and polarity to render said second transistor non-conductive.

5. A scanning generator for developing in a substantially inductive magnetic deflection yoke a periodically recurring sawtooth current waveform having during each cycle a relatively long trace interval and a relatively short retrace interval, comprising: a blocking oscillator including a first transistor having a base, emitter and collector, an emitter-collector circuit including an inductive load and a first source of unidirectional operating potential, said first transistor conducting during each of said trace intervals and cutting off during each of said retrace intervals, said inductive load thereby building up and storing energy throughout each of said trace intervals but dissipating said stored energy during each of said retrace intervals with a consequent build up of an inverse voltage between said collector and emitter of said first transistor; an energy conservation circuit, including a unidirectional device, inductively coupled to said inductive load for returning, during each of said retrace intervals, some of the stored energy back to said potential source while at the same time limiting the magnitude of said inverse voltage developed between said collector and emitter of said first transistor; and an output stage including a second transistor having a base, emitter and collector, an emitter-collector circuit including said deflection yoke, a base-emitter circuit coupled to said inductive load, and a second source of uni-directional operating potential, said inductive load developing a drive signal having a component during each of said trace intervals for rendering said second transistor conductive thereby to establish an output current in said yoke of sawtooth waveform and another component during each of said retrace intervals, resulting from said stored energy, of an amplitude and polarity to render said second transistor non-conductive.

6. A scanning generator for developing in a substantially inductive magnetic deflection yoke a periodically recurring sawtooth current waveform having during each cycle a relatively long trace interval and a relatively short retrace interval, comprising: a blocking oscillator including a first transistor having a base, emitter and collector, an emitter-collector circuit including an inductive load and the primary winding of a transformer, a base circuit including one secondary winding of said transformer, and a first source of unidirectional operating potential, said first transistor conducting during each of said trace intervals and cutting off during each of said retrace intervals, said inductive load and primary winding thereby both building up and storing energy throughout each of said trace intervals but dissipating said stored energy during each of said retrace intervals with a consequent build-up of an inverse voltage between said collector and emitter and between said base and collector of said first transistor; an energy conservation circuit including another secondary winding of said transformer for returning during each of said retrace intervals some of the stored energy in said primary winding back to said first potential source while at the same time limiting the magnitude of the inverse voltage developed between said collector and base of said first transistor; and an output stage including a second transistor having a base, emitter and collector electrodes, an emitter-collector circuit including said deflection yoke, a base-emitter circuit coupled to said inductive load, and a second source of unidirectional operating potential, said inductive load developing a drive signal having a component during each of said trace intervals for rendering said second transistor conductive thereby to establish an output current in said yoke of sawtooth waveform and another component during each of said retrace intervals, resulting from said stored energy, of an amplitude and polarity to render said second transistor non-conductive.

7. A scanning generator for developing in a substantially inductive magnetic deflection yoke a periodically recurring sawtooth current waveform having during each cycle a relatively long trace interval and a relatively short retrace interval, comprising: a transistor having a base, emitter and collector and of the type in which collector current is directly proportional to base input drive current; a source of unidirectional operating potential coupled to said transistor; means coupling said deflection yoke to said emitter and collector, the inductance of said yoke restricting the time rate of change of collector current to a predetermined maximum rate; and means for supplying input drive current to said base which increases substantially linearly throughout each of said trace intervals, the amplitude at any given instant during each trace interval being only sufficient to effect the maximum collector current permitted by the inductance of said yoke at that time.

8. A scanning generator for developing in a substantially inductive magnetic deflection yoke a periodically recurring sawtooth current waveform having during each cycle a relatively long trace interval and a relatively short retrace interval, comprising: a transistor having a base, emitter and collector and of the type which stores minority carriers in the base-collector region when the base-emitter junction is forward baised and collector current flows: a source of unidirectional operating potential coupled to said transistor; means coupling said deflection yoke to said emitter and collector; means including an inductive circuit which stores energy during each of said trace intervals for applying an input drive voltage to said base-emitter junction having a component during each of said trace intervals which forward biases said junction to supply input drive current to said base thereby to effect current translation through the emitter-collector path and said deflection yoke, the collector current continuing for a finite time immediately subsequent to each trace interval, even in the absence of said input drive voltage, as a result of the stored minority carrier, the stored energy in said inductive circuit being utilized to produce relatively high current flow through said base-emitter junction during each retrace interval in a direction to facilitate a relatively rapid sweeping away of the minority carriers in order to minimize said finite time interval; and biasing means, comprising a parallel combination of a resistor and a capacitor included in said drive voltage applying means, for developing a bias voltage of a polarity tending to reverse bias said base-emitter junction.

9. A scanning generator for developing in a substantially inductive magnetic deflection yoke a periodically recurring sawtooth current waveform having during each cycle a relatively long trace interval and a relatively short retrace interval, comprising: a transistor having a base, emitter and collector and of the type which stores minority carriers in the base-collector region when the base-emitter junction is forward biased and collector current flows; a source of unidirectional operating potential coupled to said transistor; means coupling said deflection yoke to said emitter and collector; a source of input drive voltage, including an inductive circuit which stores energy during each of said trace intervals, having one series of components of one polarity occurring during trace intervals and having another series of components of the other polarity occurring during retrace intervals; means for utilizing said one series of components of said input drive voltage to forward bias said base-emitter junction and supply input drive current to said base during each of said trace intervals to effect current translation through the emitter-collector path and said yoke and for utilizing said other series of components of said input drive voltage to reverse bias said base-emitter junction during each of said retrace intervals tending to terminate the collector current, the collector current continuing for a finite time immediately subsequent to each trace interval as a result of the stored minority carriers, the stored energy in said inductive circuit being utilized to produce relatively high current flow through said base-emitter junction during each of said retrace intervals in a direction to facilitate a relatively rapid sweeping away of the minority carriers in order to minimize said finite time interval; and biasing means, comprising a parallel combination of a resistor and a capacitor included in said utilizing means, for developing a bias voltage of a polarity tending to reverse bias said base-emitter junction.

10. A scanning generator for developing in a magnetic deflection yoke, having both inductance and resistance, a periodically recurring sawtooth current waveform having during each cycle a relatively long trace interval and a relatively short retrace interval, comprising: a transistor having a base, emitter and collector; a source of unidirectional operating potential coupled to said transistor; means coupling said yoke to the emitter-collector path of said transistor; an auto-transformer having a primary winding and an additional winding connected in series-aiding relationship; means coupling said primary winding in parallel with said yoke; a damper diode coupled to the series arrangement of said primary winding and said additional winding; and means coupled to said base and said emitter for forward biasing the emitter-base junction of said transistor during each of said trace intervals and for reverse biasing said junction during each of said retrace intervals to effect the translation of collector current from said potential source and through said yoke in one direction during at least the second half of each of said trace intervals and to effect the translation of current from the energy stored, during each retrace interval, in the combination of said yoke and primary winding and through said damper diode and yoke in the other direction during at least the first half of each of said trace intervals, the current through said yoke being sawtooth shaped but tending to be slightly non-linear as a result of the resistance of said yoke, such non-linearity being corrected however by the portion of current flowing therethrough contributed by said additional winding.

11. A scanning generator for developing in a substantially inductive magnetic deflection yoke a periodically recurring sawtooth current waveform having during each cycle a relatively long trace interval and a relatively short retrace interval, comprising: a transistor having a base, emitter and collector; a series combination of an inductance coil and a source of unidirectional operating potential of substantially constant voltage; a circuit including said series combination, said yoke, and the emitter-collector path of said transistor; a capacitor effectively coupled in parallel with said series combination of said source of operating potential and said inductance coil to provide a voltage having a parabolic component during each of said trace intervals; and means for forward biasing the base-emitter junction of said transistor during each of said trace intervals effectively to apply said parabolically varying voltage across said yoke to product yoke current of substantially sawtooth waveform with a slight S-shaped component as a result of the parabolic component of said operating voltage.

12. A horizontal scanning system and high voltage source for a television receiver comprising: a horizontal output transformer having leakage inductance and capacitance and including a multi-legged core, a primary winding wound on but slidable along one leg of said core, and a high voltage secondary winding wound on another leg of said core; a magnetic deflection yoke coupled to said primary winding; and means for developing in said yoke a periodically recurring sawtooth current waveform of a predetermined frequency having during each cycle a relatively long trace interval and a relatively short retrace interval, said transformer subject to developing undesired ringing signals during each of said trace intervals as a result of said leakage inductance and capacitance at a frequency higher than said predetermined frequency but such ringing signals being minimized by adjustment of said primary winding to an optimum point along said one leg of said core.

13. A horizontal scanning system and high voltage source for a television receiver, comprising: a horizontal output auto-transformer having leakage inductance and capacitance including a core, a primary winding wound relatively tightly on said core, and a high voltage secondary winding wound on said core; a magnetic deflection yoke coupled to said primary winding; means for developing in said yoke a periodically recurring sawtooth current wave form of a predetermined frequency having during each cycle a relatively long trace interval and a relatively short retrace interval, said transformer subject to developing undesired ringing signals as a result of said leakage inductance and capacitance at a frequency higher than said predetermined frequency; an additional winding wound around said core and connected in series-aiding relationship with said primary winding; and a diode damper coupled to the combination of said primary winding and said additional winding, said additional winding being relatively loosely wound around said core in order to minimize said ringing signals.

14. A scanning generator for developing in a substantially inductive magnetic deflection yoke a periodically recurring sawtooth current waveform having during each cycle a relatively long trace interval and a relatively short retrace interval, comprising: an oscillator including a first transistor, an inductance coil load, and means for alternately rendering said first transistor conductive during said trace intervals and nonconductive during said intervening retrace intervals, said inductance coil load thereby building up and storing energy during at least a portion of each of said trace intervals; an output stage including a second transistor having input and output electrodes, the latter electrodes being coupled to said deflection yoke; means coupled to a tap of said inductance coil load for supplying a drive signal to the input electrodes of said second transistor to render said second transistor conductive during each of said trace intervals thereby to establish an output current in said deflection yoke of sawtooth wave shape, said drive signal containing a component during each of said retrace intervals, resulting from said stored energy, of an amplitude and polarity to render said second transistor non-conductive; and biasing means, comprising a parallel combination of a resistor and a capacitor included in said drive signal supplying means, for developing a reverse bias voltage of a polarity tending to render said second transistor non-conductive.

15. A scanning generator for developing in a substantially inductive magnetic deflection yoke a periodically recurring saw-tooth current wave form having during each cycle a relatively long trace interval and a relatively short retrace interval, comprising: an oscillator including a first transistor, a load including an inductance coil having an intermediate tap therealong, and means for alternately rendering said first transistor conductive during said trace intervals and non-conductive during said intervening retrace intervals, said load thereby building up and storing energy during at least a portion of each of said trace intervals; an output stage including a second transistor having input and output electrodes, the latter electrodes being coupled to said deflection yoke; means coupled to said tap for effectively coupling only a portion of said inductance coil across the input electrodes of said second transistor to apply a drive voltage thereto for rendering said second transistor conductive during each of said trace intervals thereby to establish an output current in said deflection yoke of sawtooth waveshape, said drive voltage containing a component during each of said retrace intervals, resulting from said stored energy, of an amplitude and polarity to render said second transistor non-conductive; and means included in said last-mentioned coupling means for developing a bias voltage of a polarity which is effectively subtracted from said drive voltage during each of said trace intervals and added to said drive voltage during each of said retrace intervals.

16. A horizontal scanning and high voltage system for an image-reproducing device in a television receiver, comprising: a horizontal output transformer having leakage inductance and capacitance and including a core, a primary winding wound on but slidable along said core, and a high voltage secondary winding, having low and high potential terminals, wound on said core; a high voltage rectifier tube having an anode; means coupling said high potential terminal to said anode and said low potential terminal to a point of reference potential; a magnetic deflection yoke coupled to said primary winding; means for developing in said yoke a periodically recurring sawtooth current waveform of a predetermined frequency having during each cycle a relatively long trace interval and a relatively short retrace interval to provide a scanning raster in said image-reproducing device of predetermined width, said transformer subject to developing undesired ringing signals as a result of said leakage inductance and capacitance at a frequency higher than said predetermined frequency but such ringing signals being minimized by adjustment of said primary winding to an optimum point along said core; and means, including an adjustable sleeve encompassing said high voltage rectifier tube and connected to said point of reference potential, for varying the capacitance between said anode and said point of reference potential in order to change the width of said scanning raster without appreciably affecting the condition of minimum ringing.

17. A horizontal scanning and high voltage system for a television receiver, comprising: a horizontal output transformed including a core, a primary winding wound relatively tightly around said core, and a high voltage secondary winding wound on said core; a magnetic deflection yoke coupled to said primary winding; an additional winding relatively loosely wound around said core and connected in series-aiding relationship with said primary winding; a diode damper coupled to the combination of said primary winding and said additional winding; and means for developing in said yoke a periodically recurring sawtooth current waveform of a predetermined frequency having during each cycle a relatively long trace interval and a relatively short retrace interval, retrace oscillations having both fundamental and third harmonic components being developed in said system during each retrace interval, but both said components being damped at the termination of each retrace interval at least partially as a result of the loosely wound characteristic of said additional winding.

References Cited by the Examiner

UNITED STATES PATENTS

| | | | |
|---|---|---|---|
| 2,564,471 | 8/51 | Eaton | 328—133 |
| 2,678,413 | 5/54 | Adler et al. | 315—27 X |
| 2,694,143 | 11/54 | Chambers | 328—133 |
| 2,817,788 | 12/57 | Landon et al. | 315—27 |
| 2,907,825 | 10/59 | Janssen | 315—27 X |
| 2,933,641 | 4/60 | Goodrich | 315—27 |
| 2,962,626 | 11/60 | Berg et al. | 315—27 |

FOREIGN PATENTS

| | | |
|---|---|---|
| 197,874 | 5/58 | Austria. |
| 867,606 | 5/61 | Great Britain. |

OTHER REFERENCES

IRE Dictionary of Electronics Terms and Symbols, Institue of Radio Engineers, New York, 1961, pp. 102, 130.

DAVID G. REDINBAUGH, *Primary Examiner.*

RALPH G. NILSON, *Examiner.*